United States Patent
Davis et al.

(10) Patent No.: US 11,765,508 B2
(45) Date of Patent: Sep. 19, 2023

(54) WEARABLE AUDIO DEVICE WITH CENTRALIZED STEREO IMAGE AND CORRESPONDING METHODS

(71) Applicant: Motorola Mobility LLC, Chicago, IL (US)

(72) Inventors: Giles T Davis, Downers Grove, IL (US); Steve C Emmert, McHenry, IL (US); Ioannis A. Zigras, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 154 days.

(21) Appl. No.: 17/505,514

(22) Filed: Oct. 19, 2021

(65) Prior Publication Data
US 2023/0082132 A1    Mar. 16, 2023

(30) Foreign Application Priority Data

Sep. 15, 2021 (GR) .............................. 20210100611

(51) Int. Cl.
*H04R 5/02* (2006.01)
*H04R 5/04* (2006.01)
(Continued)

(52) U.S. Cl.
CPC ............. *H04R 5/04* (2013.01); *G06F 3/165* (2013.01); *H04R 5/02* (2013.01); *H04S 1/007* (2013.01);
(Continued)

(58) Field of Classification Search
None
See application file for complete search history.

(56) References Cited

U.S. PATENT DOCUMENTS

| 6,091,832 A * | 7/2000 | Shurman ................ G02C 11/10 381/381 |
| 2001/0050991 A1 * | 12/2001 | Eves ...................... H04R 5/023 381/11 |

(Continued)

FOREIGN PATENT DOCUMENTS

JP    WO-2021005806 A1 *    1/2021    ........... G10K 11/178

OTHER PUBLICATIONS

WO2021/005806, Speaker Sysetm Sound Processing Device, Sound Processing Method and Program, Feb. 14, 2021, English Translation, (Year: 2021).*

(Continued)

*Primary Examiner* — Duc Nguyen
*Assistant Examiner* — Assad Mohammed
(74) *Attorney, Agent, or Firm* — Philip H. Burrus, IV (57) ABSTRACT

A wearable electronic device includes an anterior pendant and a posterior pendant. A first neck strap couples a first side of the anterior pendant to the posterior pendant, while a second neck strap couples a second side of the anterior pendant to the posterior pendant. The posterior pendant includes a first single channel posterior audio output delivering a left channel audio signal through a first port and a second single channel posterior audio output delivering a right channel audio signal from a second port. The anterior pendant has a single channel anterior audio output delivering a combined left channel audio signal and right channel audio signal to pull the stereo image defined by the combined acoustic signals toward the anterior pendant.

20 Claims, 8 Drawing Sheets

(51) Int. Cl.
*H04S 1/00* (2006.01)
*G06F 3/16* (2006.01)

(52) U.S. Cl.
CPC ...... *H04R 2430/01* (2013.01); *H04S 2400/13* (2013.01)

(56) References Cited

U.S. PATENT DOCUMENTS

| | | | | |
|---|---|---|---|---|
| 2003/0021433 | A1* | 1/2003 | Lee | H04R 5/02 381/86 |
| 2008/0013778 | A1* | 1/2008 | Lee | H04R 5/02 381/385 |
| 2014/0160362 | A1* | 6/2014 | Shintani | H04N 21/439 348/738 |
| 2017/0170918 | A1* | 6/2017 | Nicolino, Jr. | H04W 4/90 |
| 2018/0343534 | A1* | 11/2018 | Norris | G06V 40/161 |
| 2019/0227323 | A1* | 7/2019 | Sendai | H04R 5/0335 |
| 2021/0233378 | A1* | 7/2021 | Murati | G08B 21/245 |

OTHER PUBLICATIONS

WO2021/005806, Speaker Sysetm Sound Processing Device, Sound Processing Method and Program, Feb. 14, 2021, English Translation, Sangakkara (Year: 2021).*

"JBL Soundgear—Internal Device Pictures", Pictures taken by inventors of present application—U.S. Appl. No. 17/505,514; Taken prior to filing of present application.

"JBL Soundgear BTA Wearable Neck Speaker", Unknown Publication Date; Viewed online at https://www.ebay.com/itm/224673745985?chn=ps&_trkparms=ispr%3D...0602&merchantid=51291 &msclkid=d293adc019a71c7157f7cf57eb8fbbb3.

* cited by examiner

WEARABLE AUDIO DEVICE WITH CENTRALIZED STEREO IMAGE AND CORRESPONDING METHODS

CROSS REFERENCE TO PRIOR APPLICATIONS

This application claims priority and benefit under 35 U.S.C. § 119 from Greek Patent Application No. 20210100611, filed Sep. 15, 2021, which is incorporated by reference by rule in accordance with 37 CFR § 1.57.

BACKGROUND

Technical Field

This disclosure relates generally to wearable electronic devices, and more particularly to wearable electronic devices with audio outputs.

Background Art

Portable electronic devices, such as smartphones, tablet computers, and wearable electronic devices, are becoming ubiquitous in modern society. Many people today own a smart phone or other wireless communication device with which they communicate with friends, workers, and family, manage calendars, purchase goods and services, listen to music, watch videos, play games, and surf the Internet.

A challenge presented to designers of such devices stems from the human form and the challenges associated with getting information from an electronic device to the user. For instance, while many of the features of a smartphone can be integrated into a smart watch, a user must still move their arm toward their face to see the display of the smart watch or move their arm toward their ear to listen to audio from its outputs. Similarly, while augmented reality displays can be integrated into eyeglasses, such displays may be too small to render sufficient data. In the audio space, placing stereo speakers in front of a user does not lend itself to providing a robust stereo image as there is not enough separation between speakers relative to the ears. Placing stereo speakers beneath the ears can result in the device having a strange looking form factor that is uncomfortable to wear. It would be advantageous to have an improved wearable electronic device that provides a robust stereo image in a pleasant form factor.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to delivering a left channel audio signal output from a first side of a posterior pendant and a right channel audio signal output from a second side of the posterior pendant, while also delivering a monaural audio signal output combining the left channel audio signal output and the right channel audio signal output from an anterior pendant to pull the stereo image defined by the combined audio output signals toward the anterior pendant to a central location within the wearable electronic device. Any process descriptions or blocks in flow charts should be understood as representing modules, segments, or portions of code which include one or more executable instructions for implementing specific logical functions or steps in the process.

Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

It will be appreciated that embodiments of the disclosure described herein may be comprised of one or more conventional processors and unique stored program instructions that control the one or more processors to implement, in conjunction with certain non-processor circuits, some, most, or all of the functions of providing a left channel audio signal output and right channel audio signal output from a posterior pendant while delivering a monaural audio signal output combining the right channel audio signal output and the left channel audio signal output to move a combined stereo image toward the front of a wearable electronic device as described herein. The non-processor circuits may include, but are not limited to, a radio receiver, a radio transmitter, signal drivers, clock circuits, power source circuits, and user input devices. As such, these functions may be interpreted as steps of a method to perform moving the combined stereo image toward the anterior pendant of a wearable electronic device.

Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially", "essentially", "approximately", "about" or any other version thereof, are defined as being close to as understood by one of ordinary skill in the art, and in one non-limiting embodiment the term is defined to be within ten percent, in another embodiment within five percent, in another embodiment within 1 percent and in another embodiment within one-half percent. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

In prior art wearable audio output electronic devices, the only way to achieve the delivery of a reasonable stereo image presentation to a user is to place loudspeakers directly beneath the ears of the wearer. Using a wearable electronic device that effectively looks like an inflatable neck pillow one would wear while trying to sleep on an airplane, a left channel loudspeaker can be placed directly beneath the user's left ear while a right channel loudspeaker is placed directly beneath the user's right ear. Such a configuration provides a reasonable stereo image to the user. However, as noted above, the form factor is bulky, looks awkward, and can make the user self-conscious when wearing the device. What's more, when the user slightly tilts their head, any stereo image that is delivered to the user can quickly collapse to one side or the other.

Embodiments of the disclosure provide an innovative and unique solution to this problem by providing a sleek, slim, and stylish wearable electronic device that includes an anterior pendant and a posterior pendant that are connected by two minimalist neck straps. Embodiments of the disclosure contemplate that it is not always practical—especially when trying to design a stylish and fashionable electronic device—to place the loudspeakers beneath the ears of a wearer. While speakers placed behind the ears can provide adequate sound quality and stereo image, this alone is suboptimal due to the fact that the stereo image sounds like it is behind the user. People like to listen to immersive music or music that they can see. They typically do not prefer to listen to posterior music sources.

Similarly, placing stereo audio output devices in front of a wearer generally fails to provide a robust stereo image, as noted above. This is due to the fact that there is not enough physical separation between the audio output devices relative to the ears to separate the left and right channels.

Experimental testing has shown that positioning a single loudspeaker in an anterior pendant that provides a monaural audio signal output combining a left channel audio signal output and a right channel audio signal output, while simultaneously providing a left channel audio signal output and a right channel audio signal output from a posterior pendant is sufficient to pull the combined stereo image from the posterior pendant toward the anterior pendant to a central location within the wearable electronic device situated at locations corresponding to a wearer's ears. Such testing has confirmed that in comparison to providing audio output from an anterior pendant alone or providing audio output from a posterior pendant alone, using a posterior pendant to deliver separate left and right channel audio, while using an anterior pendant to deliver a combined left and right channel audio output is preferred by users as the stereo image defined by the combination of these three outputs provides a rich, enveloping stereo image that sounds as if located right at the user's ears.

Accordingly, in one or more embodiments a wearable electronic device comprises an anterior pendant comprising a single channel anterior audio output delivering a combined left channel audio signal and right channel audio signal through a port of the anterior pendant. The wearable electronic device includes a posterior pendant comprising a first single channel posterior audio output delivering a left channel audio signal through a first port of the posterior pendant and a second single channel posterior audio output delivering the right channel audio signal through a second port of the posterior pendant. By delivering the combined right channel audio signal and left channel audio signal from the anterior pendant, the stereo image created by the audio outputs of the posterior pendant is pulled forward from behind a user to a location corresponding to the user's ears.

In one or more embodiments, since the distance between the user's ears and the anterior pendant and the distance between the user's ears and the posterior pendant is different, one or more processors of the wearable electronic device insert a predefined delay between the combined left channel audio signal and right channel audio signal emanating from the single channel anterior audio output and each of the left channel audio signal emanating from the first single channel posterior audio output and the right channel audio signal emanating from the second single channel posterior audio output so that the sound from the anterior pendant and the posterior pendant reaches the user's ears at the same time. Illustrating by example, since the left channel audio signal emanating from the first single channel posterior audio output and the right channel audio signal emanating from the second single channel posterior audio output are being output from loudspeakers or other devices that are situated closer to the user's ears than is the combined left channel audio signal and right channel audio signal emanating from the single channel anterior audio output, in one or more embodiments the insertion of the predefined delay would result in the latter reaching the user's ears at the same time—or intentionally before—the former. In one or more embodiments, this predefined delay is less than three milliseconds. In one or more embodiments, the predefined delay is about one millisecond. In one or more embodiments, the predefined delay is user definable so that the user can adjust where the combined stereo image is perceived.

While prior art devices have, for example, placed a left channel loudspeaker, a right channel loudspeaker, and a combined left channel plus right channel loudspeaker in front of a user in a standard left, center, right configuration for a richer stereo output, or place a left channel loudspeaker and right channel loudspeaker in front of a user with a difference signal (left channel minus right channel) loudspeaker placed behind a user for a greater sense of spaciousness, these prior art configurations do not work to move a stereo image resulting from a combination of audio signals from that delivered by the left channel loudspeaker and right channel loudspeaker as do wearable electronic devices configured in accordance with embodiments of the disclosure. By delivering the left channel audio signal and right channel audio signal from a posterior pendant in a wearable electronic device, and then providing a monaural audio signal output combining the left channel audio signal and right channel audio signal from an anterior pendant, embodiments of the disclosure optimally bring the stereo image formed by the three combined audio output signals toward the anterior pendant so that it is aligned with the ears of the user.

Figure 1:
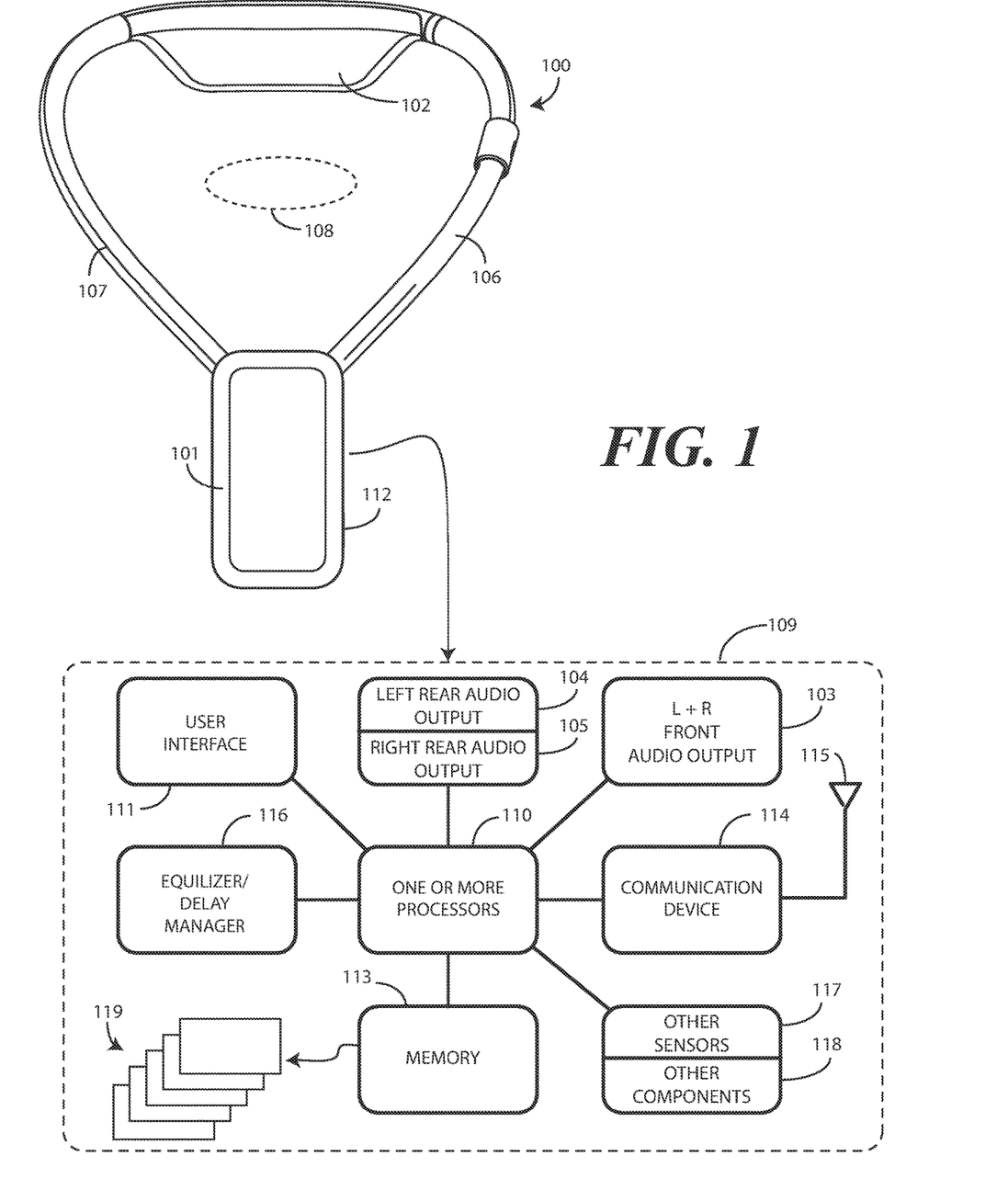
FIG. 1 illustrates one explanatory wearable electronic device in accordance with one or more embodiments of the disclosure.

Turning now to FIG. 1, illustrated therein is one explanatory wearable electronic device 100 configured in accordance with one or more embodiments of the disclosure. In one or more embodiments, the wearable electronic device 100 comprises an anterior pendant 101 and a posterior pendant 102. In one or more embodiments, the anterior pendant 101 comprises a single channel anterior audio output 103 delivering a combined left channel audio signal and right channel audio signal through a port of the anterior pendant 101. The posterior pendant 102 comprises a first single channel posterior audio output 104 delivering the left channel audio signal through a first port of the posterior pendant 102 and a second single channel posterior audio output 105 delivering the right channel audio signal through a second port of the posterior pendant 102. The combination of the combined left channel audio signal and right channel audio signal from the anterior pendant 101 and the separated left channel audio signal and right channel audio signal from the posterior pendant 102 pull a perceived stereo image 108 toward the anterior pendant 101 to a centralized location within the wearable electronic device 100.

In one or more embodiments, a first neck strap 106 couples a first side of the anterior pendant 101 to a first side of the posterior pendant 102. In one or more embodiments, a second neck strap 107 couples a second side of the anterior pendant 101 to a second side of the posterior pendant 102.

In one or more embodiments, each of the anterior pendant 101 and the posterior pendant 102 includes a housing, while the first neck strap 106 and the second neck strap 107 serve both as a right shoulder strap and left shoulder strap that allow the wearable electronic device 100 to be worn around the neck as well as to provide a conduit for electrical connections passing from the anterior pendant 101 to the posterior pendant 102 or vice versa. While the anterior pendant 101 and posterior pendant 102 can be configured as shown in FIG. 1, other configurations for each housing and/or shoulder strap and/or other mechanical configurations of wearable electronic devices will be obvious to those of ordinary skill in the art having the benefit of this disclosure.

Also illustrated in FIG. 1 is one explanatory block diagram schematic 109 of the wearable electronic device 100. In one or more embodiments, the block diagram schematic 109 can be constructed as multiple printed circuit board assemblies situated within either the housing of the anterior pendant 101, the housing of the posterior pendant 102, the first neck strap 106, the second neck strap 107, or combinations thereof. While this is one embodiment, in another embodiment the electrical connections between the anterior pendant 102 and the posterior pendant 102 are wireless. Where one or more circuit boards are used, the various components can be electrically coupled together by conductors or a bus disposed along one or more printed circuit boards, or alternatively by one or more wireless electronic communication circuits. It should be noted that the block diagram schematic 109 includes many components that are optional, but which are included in an effort to demonstrate how varied electronic devices configured in accordance with embodiments of the disclosure can be.

Illustrating by example, in one or more embodiments the wearable electronic device 100 includes a user interface 111. The user interface 111 can include an audio input device, such as a microphone, to receive audio input. The user interface 111 also includes a plurality of audio output devices to deliver audio output, which in this illustrative embodiment include the single channel anterior audio output 103 of the anterior pendant 101 and the first single channel posterior audio output 104 of the posterior pendant 102 and the second single channel posterior audio output 105 of the posterior pendant 102. Each of the single channel anterior audio output 103 of the anterior pendant 101, the first single channel posterior audio output 104 of the posterior pendant 102, and the second single channel posterior audio output 105 of the posterior pendant 102 can consist of a single loudspeaker in one or more embodiments. However, in other embodiments, multiple loudspeakers can be clustered to form each of the single channel anterior audio output 103 of the anterior pendant 101, the first single channel posterior audio output 104 of the posterior pendant 102, and the second single channel posterior audio output 105 of the posterior pendant 102 as well.

In one or more embodiments, the user interface 111 includes a display, which can optionally be configured to be touch sensitive. Where the wearable electronic device 100 is configured to be a companion electronic device to another electronic device, such as a smartphone, with its companion functionality being that of purely an audio output device, a display would be optional, in it is not required for this aural user interaction convention.

Thus, it is to be understood that the block diagram schematic 109 of FIG. 1 is provided for illustrative purposes only and for illustrating components of one wearable electronic device 100 in accordance with embodiments of the disclosure. The block diagram schematic 109 of FIG. 1 is not intended to be a complete schematic diagram of the various components required for a wearable electronic device 100. Therefore, other electronic devices in accordance with embodiments of the disclosure may include various other components not shown in FIG. 1, or may include a combination of two or more components or a division of a particular component into two or more separate components, and still be within the scope of the present disclosure.

The illustrative block diagram schematic 109 of FIG. 1 includes many different components. Embodiments of the disclosure contemplate that the number and arrangement of such components can change depending on the particular application. For example, a wearable electronic device that only includes at least one audio output with no audio input may have fewer, or different, components from a wearable electronic device having both user interface components. Similarly, a wearable electronic device that includes at least one audio output in addition to at least one audio input can include multiple audio inputs, one example of which would be a microphone array. Accordingly, electronic devices configured in accordance with embodiments of the disclosure can include some components that are not shown in FIG. 1, and other components that are shown may not be needed and can therefore be omitted.

As noted above, the user interface 111 can include a display, which may optionally be touch-sensitive. In one embodiment, users can deliver user input to the display of such an embodiment by delivering touch input from a finger, stylus, or other objects disposed proximately with the display. In one embodiment, the display is configured as an active matrix organic light emitting diode (AMOLED) display. However, it should be noted that other types of displays, including liquid crystal displays, suitable for use with the user interface would be obvious to those of ordinary skill in the art having the benefit of this disclosure. Where a display is omitted, a user interface component 112, such as a button, switch, touch sensitive surface, or other control mechanism can allow a user to operate the wearable electronic device 100.

In one embodiment, the wearable electronic device 100 includes one or more processors 110. In one embodiment, the one or more processors 110 can include an application processor and, optionally, one or more auxiliary processors. One or both of the application processor and/or the auxiliary processor(s) can include one or more processors. One or both of the application processor and/or the auxiliary processor(s) can be a microprocessor, a group of processing components, one or more ASICs, programmable logic, or other type of processing device.

The application processor and/or the auxiliary processor(s) can be operable with the various components of the block diagram schematic 109. Each of the application processor and/or the auxiliary processor(s) can be configured to process and execute executable software code to perform the various functions of the wearable electronic device 100 with which the block diagram schematic 109 operates. A storage device, such as memory 113, can optionally store the executable software code used by the one or more processors 110 during operation.

In this illustrative embodiment, the block diagram schematic 109 also includes a communication circuit 114 that can be configured for wired or wireless communication with one or more other devices or networks. The networks can include a wide area network, a local area network, and/or personal area network. The communication circuit 114 may also utilize wireless technology for communication, such as, but are not limited to, peer-to-peer or ad hoc communications such as HomeRF, Bluetooth and IEEE 802.11-based communications, as well as other forms of wireless communication such as infrared technology. The communication circuit 114 can include wireless communication circuitry, one of a receiver, a transmitter, or transceiver, and one or more antennas 115.

In one embodiment, the one or more processors 110 can be responsible for performing the primary functions of the electronic device with which the block diagram schematic 109 is operational. For example, in one embodiment the one or more processors 110 comprise one or more circuits operable with the user interface 111 to deliver audio output signals in the form of acoustic waves to a user. The source data for generating these acoustic waves could be stored in the memory 113, or alternatively may be received from an external electronic device using the communication circuit 114. The one or more processors 110 can be operable with an audio output devices to deliver audio output to a user. The executable software code used by the one or more processors 110 can be configured as one or more modules 119 that are operable with the one or more processors 110. Such modules 119 can store instructions, control algorithms, media content, digital to analog conversion algorithms, sound generation algorithms, and so forth.

In one or more embodiments, the one or more processors 110 operate with, or as, an audio input/processor. The audio input/processor is operable to receive audio input from a source, such as a person, authorized user, plurality of persons within an environment about the wearable electronic device 100, from the environment about the wearable electronic device 100, or combinations thereof. The audio input/processor can include hardware, executable code, and speech monitor executable code in one embodiment. The audio input/processor can be operable with one or both of an audio input device, such as one or more microphones, and/or the audio output devices, each of which can comprise one, or more than one, loudspeaker as previously described.

In one embodiment, the audio input/processor is configured to implement a voice control feature that allows the wearable electronic device 100 to function as a voice assistant device, which is a digital assistant using voice recognition, speech synthesis, and natural language processing to receive audio input comprising a voice command from a source, determine the appropriate response to the voice command, and then deliver the response in the form of audio output in response to receiving the audio input from the source.

Various sensors 117 can be operable with the one or more processors 110. A first example of a sensor that can be included with the various sensors 117 is a touch sensor. The touch sensor can include a capacitive touch sensor, an infrared touch sensor, resistive touch sensors, or another touch-sensitive technology that serves as a user interface 111 for the wearable electronic device 100.

Another example of a sensor 117 is a geo-locator that serves as a location detector. Location of the wearable electronic device 100 can be determined by capturing the location data from a constellation of one or more earth orbiting satellites, or from a network of terrestrial base stations to determine an approximate location.

One or more motion detectors can be configured as an orientation detector that determines an orientation and/or movement of the wearable electronic device 100 in three-dimensional space. Illustrating by example, the orientation detector can include an accelerometer, a multi-axis accelerometer, gyroscopes, or other device to detect device orientation and/or motion of the wearable electronic device 100. Other sensors 117 suitable for inclusion with the wearable electronic device 100 will be obvious to those of ordinary skill in the art having the benefit of this disclosure.

Other components 118 operable with the one or more processors 110 can include output components such as video, audio, and/or mechanical outputs. For example, the output components may include a video output component or auxiliary devices including a cathode ray tube, liquid crystal display, plasma display, incandescent light, fluorescent light, front or rear projection display, and light emitting diode indicator. Other examples of output components include audio output components such as the one or more loudspeakers used for the single channel anterior audio output 103 of the anterior pendant 101, the first single channel posterior audio output 104 of the posterior pendant 102, and the second single channel posterior audio output 105 of the posterior pendant 102, or other alarms and/or buzzers. The other components 118 can also include a mechanical output component such as vibrating or motion-based mechanisms.

In one or more embodiments, the one or more processors 110 can define one or more process engines. One example of such a process engine is the equalizer/delay manager 116. In one or more embodiments, the equalizer/delay manager 116 is operable to insert a predefined delay between the combined left channel audio signal and right channel audio signal emanating from the single channel anterior audio output 103 of the anterior pendant 101 and each of the left channel audio signal emanating from the first single channel posterior audio output 104 of the posterior pendant 102 and the right channel audio signal emanating from second single channel posterior audio output 105 of the posterior pendant. This predefined delay ensures that audio signals from the posterior pendant 102, which are closer to the user's ears, arrive at the user's ears at the same time or after as those from the anterior pendant 101, which is farther away. In one or more embodiments, the equalizer/delay manager 116 can also adjust the relative volume levels of sound emanating the combined left channel audio signal and right channel audio signal emanating from the single channel anterior audio output 103 of the anterior pendant 101 and each of the left channel audio signal emanating from the first single channel posterior audio output 104 of the posterior pendant 102 and the right channel audio signal emanating from second single channel posterior audio output 105 of the posterior pendant to affect the overall user experience as well.

Figure 4:
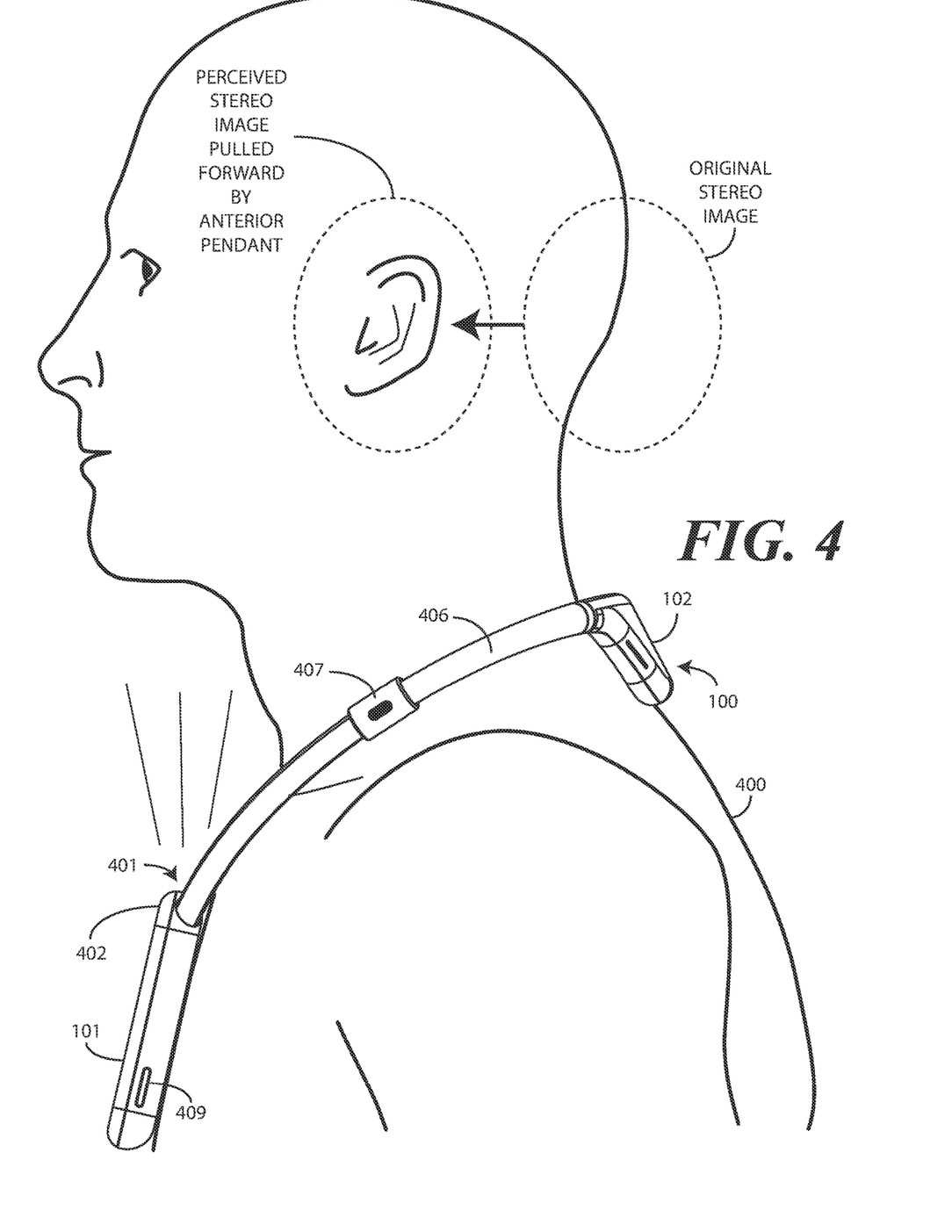
FIG. 4 illustrates a side elevation view of a user wearing one explanatory wearable electronic device in accordance with one or more embodiments of the disclosure.
Figure 5:
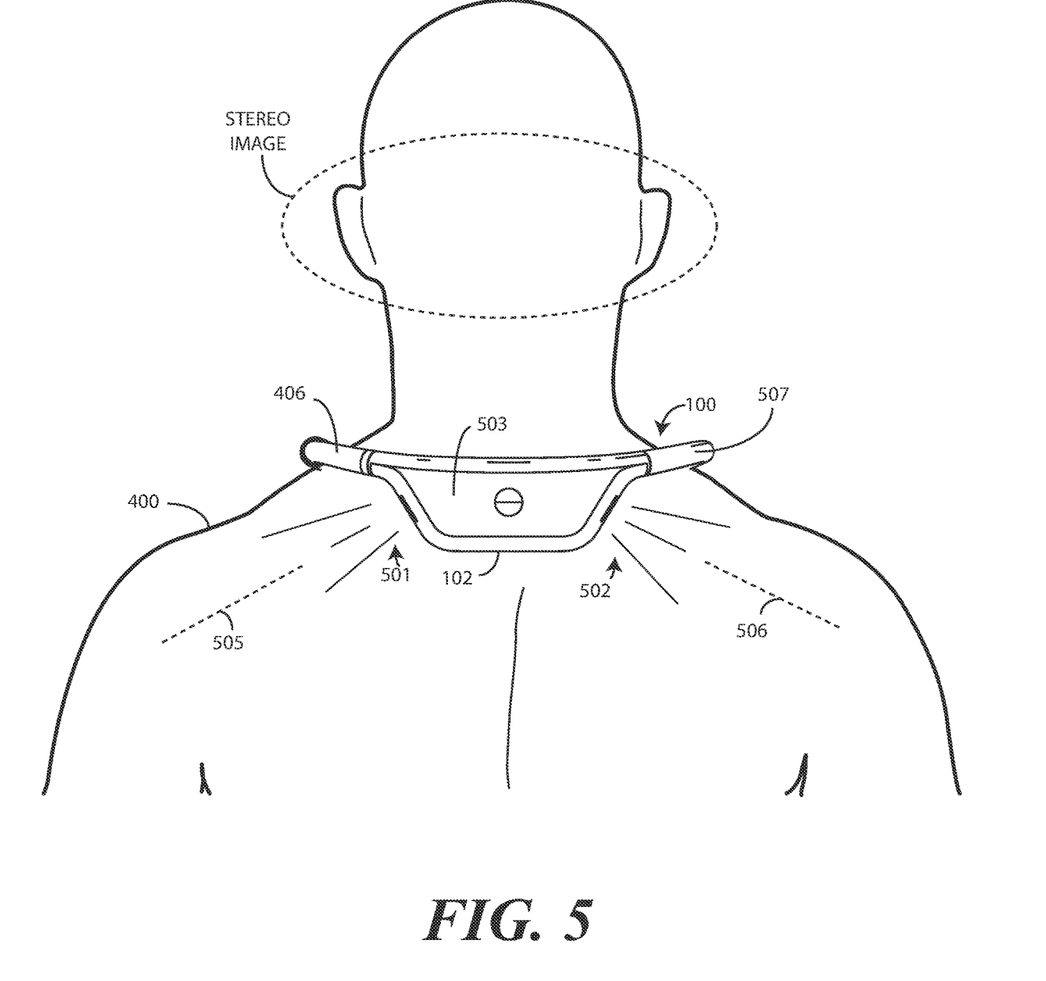
FIG. 5 illustrates a rear elevation view of the user wearing one explanatory wearable electronic device in accordance with one or more embodiments of the disclosure.

In one or more embodiments, the predefined delay is less than three milliseconds. In one or more embodiments, the predefined delay is about one millisecond. These examples are based upon the speed of sound when the wearable electronic device 100 is worn as shown in FIGS. 4 and 5 below, with the anterior pendant 101 and posterior pendant 102 positioned in the corresponding relationship to the user's ears.

In one or more embodiments, the predefined delay is user definable. Illustrating by example, in one or more embodiments a user can use the user interface 111 to define the predefined delay to adjust the location of the stereo image 108 within the perimeter of the wearable electronic device 100. Illustrating by example, embodiments of the disclosure contemplate that a user may want to adjust the stereo image 108 such that it situates slightly in front of the ears, at the ears, or slightly behind the ears. By making the predefined delay and/or relative volume level user adjustable, any of these locations becomes possible.

Each process engine can be a component of the one or more processors 110, operable with the one or more processors 110, defined by the one or more processors 110, and/or integrated into the one or more processors 110. Other configurations for these process engines, including as software or firmware modules operable on the one or more processors 110, will be obvious to those of ordinary skill in the art having the benefit of this disclosure.

Figure 2:
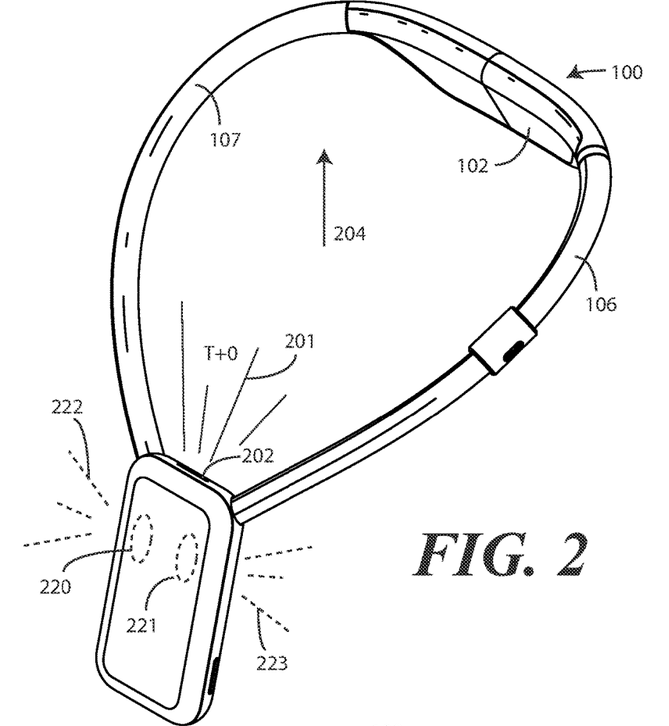
FIG. 2 illustrates a perspective view of one explanatory wearable electronic device in accordance with one or more embodiments of the disclosure.
Figure 3:
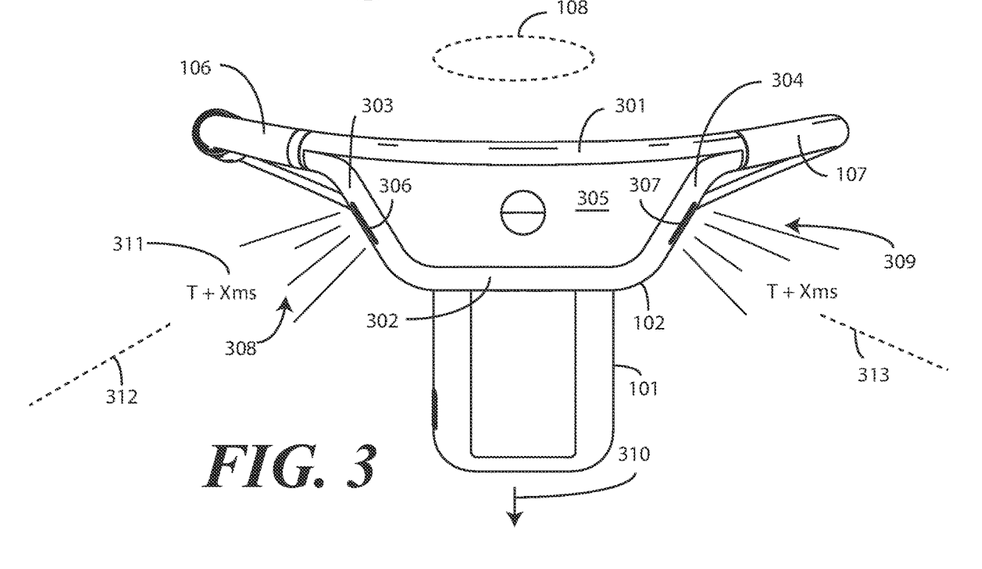
FIG. 3 illustrates a rear elevation view of one explanatory wearable electronic device in accordance with one or more embodiments of the disclosure.

Now that various hardware components have been described, attention will be turned to methods of using electronic devices in accordance with one or more embodiments of the disclosure. Turning now to FIGS. 2-3, illustrated therein is the explanatory electronic device 100 of FIG. 1 delivering audio output signals that combine to move the stereo image from a location closer to the posterior pendant 102 to one farther from the posterior pendant 102, closer to the anterior pendant 101, and situated vertically within a columnar boundary defined by the anterior pendant 101, the posterior pendant 102, the first neck strap 106, and the second neck strap 107.

As shown in FIG. 2, the single channel anterior audio output (103) of the anterior pendant 101 delivers a combined left channel audio signal and right channel audio signal output 201 through a port 202 of the anterior pendant 101. In this illustrative embodiment, the port 202 of the anterior pendant 101 is situated along an upper surface 301 of the anterior pendant 101. This results in the combined left channel audio signal and right channel audio signal output 201 being directed toward a cranial side 204 of the wearable electronic device 100.

As shown in FIG. 3, the posterior pendant 102 comprises an upper edge 301, a lower edge 302, a first side edge 303, and a second side edge 304. In one or more embodiments, the first side edge 303 and the second side edge 304 taper inward as they extend from the upper edge 301 to the lower edge 302. In so doing, the upper edge 301, which defines a first end of the posterior pendant 102, the lower edge 302, which defines a base of the posterior pendant 102, define a caudally facing (when the wearable electronic device 100 is worn as shown in FIGS. 3-4 below) frustoconical posterior pendant major surface 305. As used herein, "frustoconical" takes its ordinary meaning of the shape of a frustum or cone with its pointed end cut off by a plane running substantially parallel to its base. In this vein, the caudally facing frustoconical posterior pendant major surface is wider at the top than at the bottom with the upper edge 301 being oriented substantially parallel with the lower edge 302, and with the first side edge 303 and second side edge 304 tapering inward as they extend downward (caudally) from the upper edge 301.

In one or more embodiments, the first port 306 of the posterior pendant 102 is situated on the first side edge 303, while the second port 307 of the posterior pendant 102 is situated on the second side edge 304. This arrangement, counterintuitively, causes the left channel audio signal output 308 and the right channel audio signal output 309 to be directed downward, i.e., toward a caudal side 310 of the wearable electronic device 100 and away from each other.

This orientation results in central axes 312, 313 of the first port 306 of the posterior pendant 102 and the second port 307 of the posterior pendant 102, which pass from an interior of the posterior pendant 102 to an exterior of the posterior pendant 102, extending downward from the upper edge 301 of the posterior pendant 102 and away from each other. Thus, the left channel audio signal output 308 is delivered downward and away from both the posterior pendant 102 and the right channel audio signal output 309, while the right channel audio signal output 309 is delivered downward and away from both the posterior pendant 102 and the left channel audio signal output 308.

While perhaps initially counterintuitive, delivering the left channel audio signal output 308 and right channel audio signal output 309 downward and away from the posterior pendant 102 at roughly forty-five degree angles maximizes the aural separation of each channel, thereby improving the robustness and richness of the stereo image 108 resulting from the combination of the combined left channel audio signal output and right channel audio signal output 201 from the port 202 in the anterior pendant 101 and the left channel audio signal output 308 and the right channel audio signal output 309 from the first port 306 and second port 307 of the posterior pendant 102.

As shown in FIGS. 2-3, with more clarity shown below in FIGS. 4-5, in one or more embodiments when the wearable electronic device 100 is worn the anterior pendant 101 is farther from the user's ears than is the posterior pendant 102. Consequently, the port 202 of the anterior pendant 101 is farther from the user's ears than either the first port 306 of the posterior pendant 102 or the second port 307 of the posterior pendant 102. Accordingly, it takes more time for the the combined left channel audio signal and right channel audio signal output 201 to reach the user's ears than either the left channel audio signal output 308 or right channel audio signal output 309.

To compensate, in one or more embodiments one or more processors (110) of the wearable electronic device 100 insert a predefined delay 311 between the combined left channel audio signal and right channel audio signal output 201 emanating from the single channel anterior audio output (103) and each of the left channel audio signal output 308 and right channel audio signal output 309 emanating from the first single channel posterior audio output (104) and the second single channel posterior audio output (105), respectively. Since sound travels at 1100 feet per second, which is roughly one millisecond per foot, in one or more embodiments the predefined delay 311 is about one millisecond. Embodiments of the disclosure contemplate that delays over three milliseconds will affect the desirability of the stereo image 108. Accordingly, in one or more embodiments the predefined delay 311 is less than three milliseconds. As previously described, the predefined delay 311 can be user definable in one or more embodiments.

Turning now to FIGS. 4 and 5, illustrated therein is a user 400 wearing a wearable electronic device 100 configured in one or more embodiments of the disclosure. As previously described, the wearable electronic device 100 includes an anterior pendant 101 and a posterior pendant 102. In this illustrative embodiment the anterior pendant 101 is generally rectangular in shape and situates at the anterior portion of the user's torso by sitting flush against the user's chest with the first port (202) of the anterior pendant 101 situating beneath the user's chin in front of the user's ears. The posterior pendant 102 takes the shape of an inverted frustoconical quadrilateral, and situates on the posterior portion of the user's torso by sitting flush against the user's shoulders behind the neck and behind the user's ears.

A right shoulder strap 507 passes across the user's right shoulder and couples the right sides of the anterior pendant 101 and the posterior pendant 102 together. Likewise, a left shoulder strap 406 passes across the user's left shoulder and couples the left sides of the anterior pendant 101 and the posterior pendant 102 together. In this illustrative embodiment, each of the right shoulder strap 507 and the left shoulder strap 406 are circular in cross section and exit from the top of the posterior pendant 102 as extensions from the widest edge of the inverted frustoconical quadrilateral and then enter the upper corners of the rectangle defining the anterior pendant 101. An optional decoupling clasp 407 can be used to open the left shoulder strap 406 so that the wearable electronic device 100 need not be passed over the user's head to be donned. While shown positioned along the left shoulder strap 406 in FIG. 4, the optional decoupling clasp 407 could be placed on the right shoulder strap 507 as well.

In this illustrative embodiment, a user actuation device 409, shown as a button in FIG. 4, is placed on a minor surface of the anterior pendant 101. The user actuation device 409 can be used to turn the wearable electronic device 100 ON, turn it OFF, and to perform other control operations as well. For example, a long press of the user actuation device 409 when the wearable electronic device 100 is OFF may turn the same ON, while short presses of the user actuation device 409 while the wearable electronic device 100 is ON may perform certain control operations such as track advance, pausing, playing, and so forth. A long press of the user actuation device 409 when the wearable electronic device 100 is ON may turn the wearable electronic device 100 OFF.

The wearable electronic device 100 again includes a plurality of audio outputs. In one or more embodiments, these comprise a left channel audio signal output 501 situated at a first end of the posterior pendant 102 and a right channel audio signal output 502 situated at a second end of the posterior pendant 102. In the illustrative embodiment of FIGS. 4-5, the left channel audio signal output 501 and the right channel audio signal output 502 are separated from each other by the body 503 of the posterior pendant 102. On the anterior pendant 101, a single combined left channel and right channel audio signal output 401 is situated at a cranial edge 402 of the anterior pendant 101.

As shown in FIG. 5, the first end of the posterior pendant 102, the base of the posterior pendant 102, and the second end of the posterior pendant define a caudally facing frustoconical posterior pendant major surface. This results in central axes 505, 506 of the left channel audio signal output 501 and the right channel audio signal output 502 being directed downward and away from the user's ears.

Figure 6:
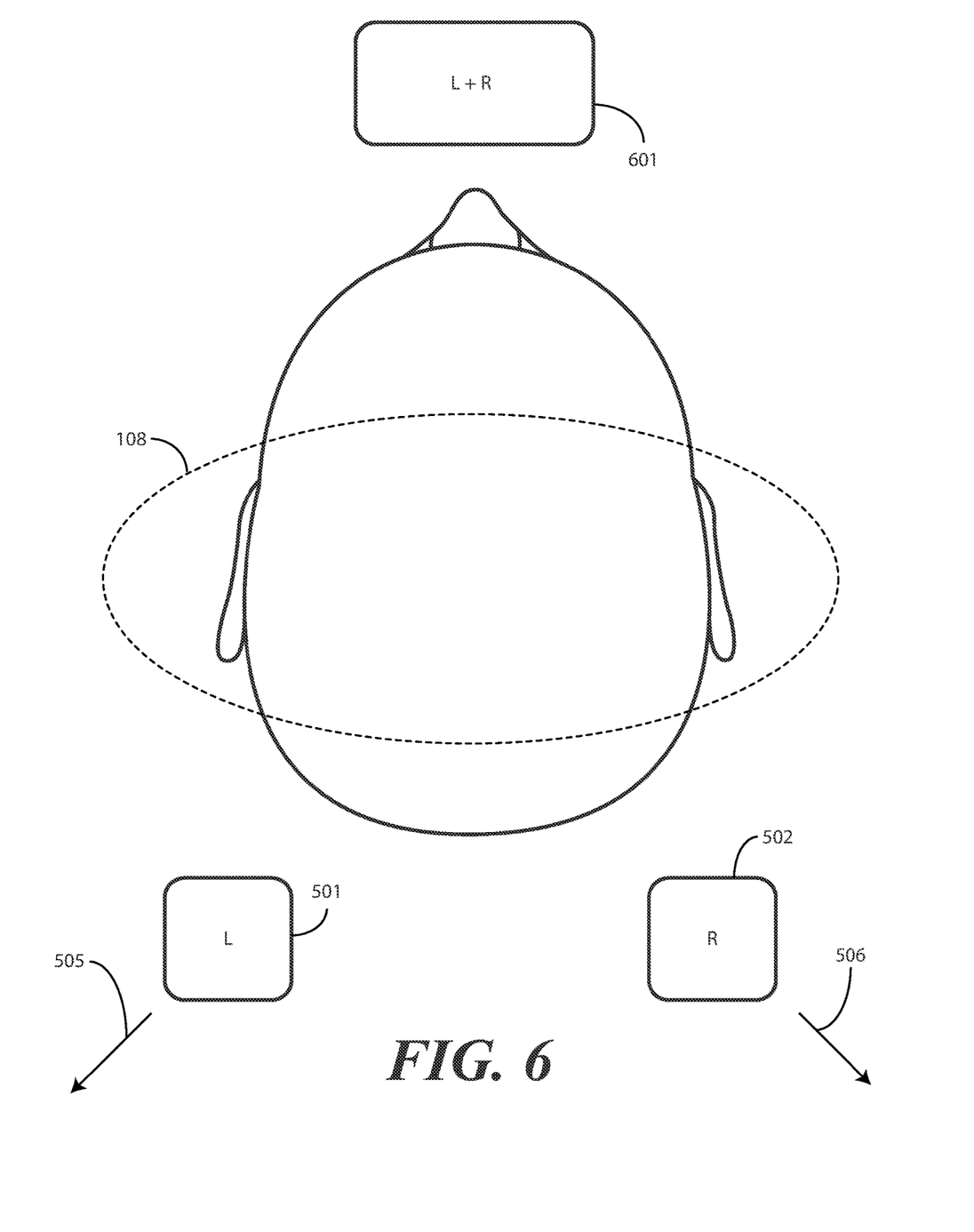
FIG. 6 illustrates a simplified schematic block diagram of one explanatory audio output arrangement for a wearable electronic device in accordance with one or more embodiments of the disclosure.

Turning now to FIG. 6, a simplified schematic diagram shows how the user 400 perceives audio as a centralized stereo image 108 from the various outputs shown in FIGS. 4-5. A left channel audio signal output 501 is delivered from a first side of the posterior pendant (102) to the user's ears. Meanwhile, a right channel audio signal output 502 is delivered from a second side of the posterior pendant (102) to the user's ears. The caudally and outwardly facing orientation of the central axes 505, 506 of the left channel audio signal output 501 and the right channel audio signal output 502 results in maximum channel separation for the physical form factor of the posterior pendant (102), thereby creating a robust stereo image 108 for the user 400.

Without the anterior pendant (101), this stereo image 108 would situate above the posterior pendant (102), which would be perceived as being behind the user's head (because it is). However, by delivering a monaural audio signal output 601 combining the left channel audio signal output 501 and the right channel audio signal output 502 from the anterior pendant (101) pulls the stereo image 108 defined by the combination of the left channel audio signal output 501, the right channel audio signal output 502, and the monaural audio signal output 601 toward the anterior pendant (101), which situates the stereo image 108 at the user's ears as shown in FIG. 6.

Figure 7:
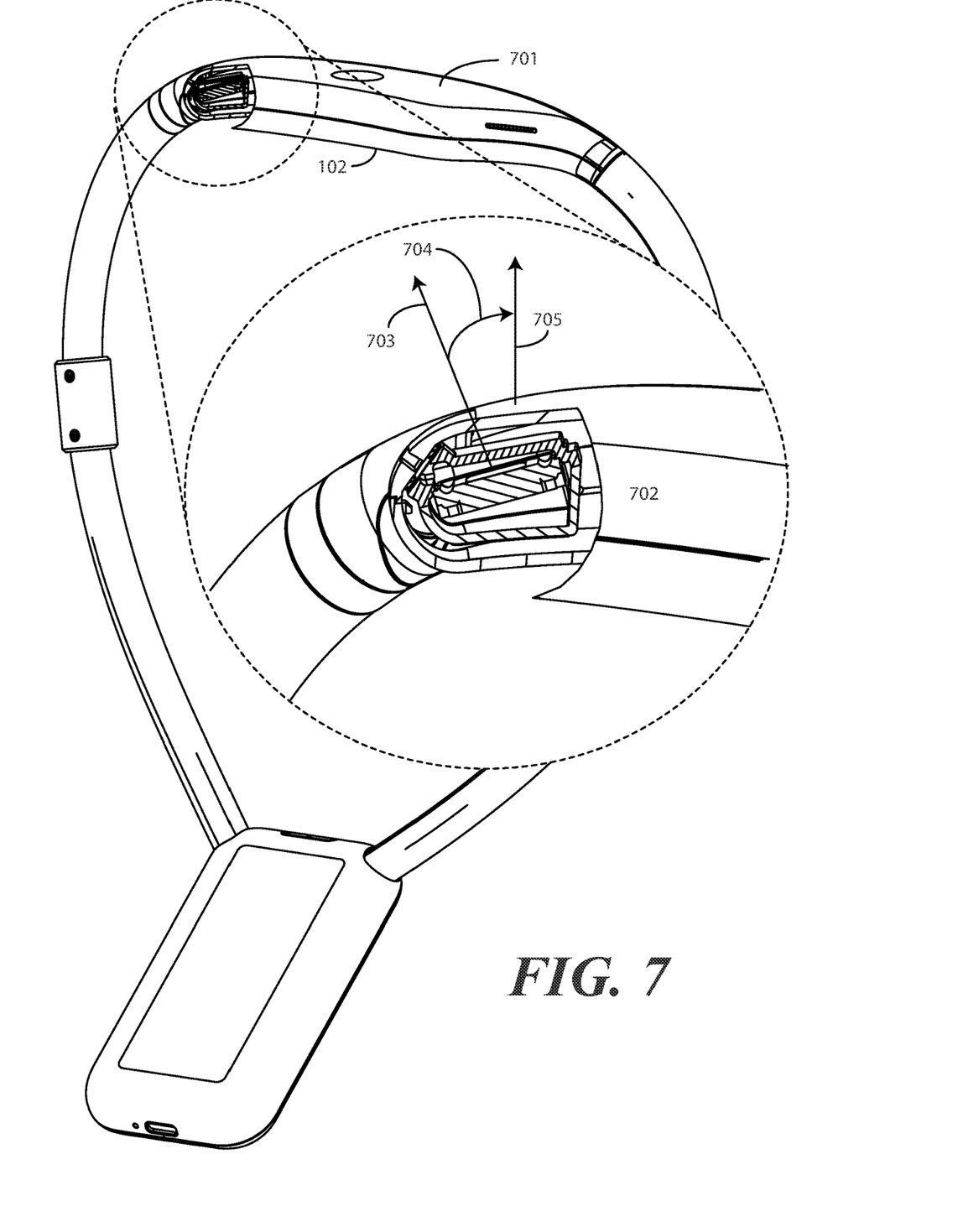
FIG. 7 illustrates a sectional view of a posterior pendant illustrating the orientation and alignment of one explanatory audio output device relative to the pendant housing in accordance with one or more embodiments of the disclosure.

Turning now to FIG. 7, illustrated therein is a sectional view of one explanatory posterior pendant 102 configured in accordance with one or more embodiments of the disclosure showing how a single loudspeaker functioning as an audio output can be oriented to maximize performance so as to deliver an optimally rich stereo image. As shown in FIG. 7, the posterior pendant 102 defines a major surface 701 extending between the upper edge, the lower edge, the first side edge, and the second side edge. The single channel posterior audio output 702, which is shown here as being a single loudspeaker, has a central axis 703 passing through the major surface 701 at a non-orthogonal angle 704.

Said differently, the central axis 703 of the single channel posterior audio output 702, which is shown as the left channel audio signal output but can be reflected to illustrate the right channel audio signal output, are skew relative to another axis 705 oriented normal with the major surface 701, which is the caudally facing frustoconical posterior pendant major surface in this illustrative example. This "tilt" of the loudspeaker relative to the major surface 701 improves the high frequency response of the output of loudspeaker without impacting the stereo image emanating from the anterior pendant 102. Given the shape and placement of the anterior pendant 102, how the sound arrives from the loudspeaker to the ports in the anterior pendant 102 generally does not particularly impact the stereo image emanating from the anterior pendant 102. The port dimensions are small compared to the wavelengths being transmitted, therefore the port is effectively omni directional.

Figure 8:
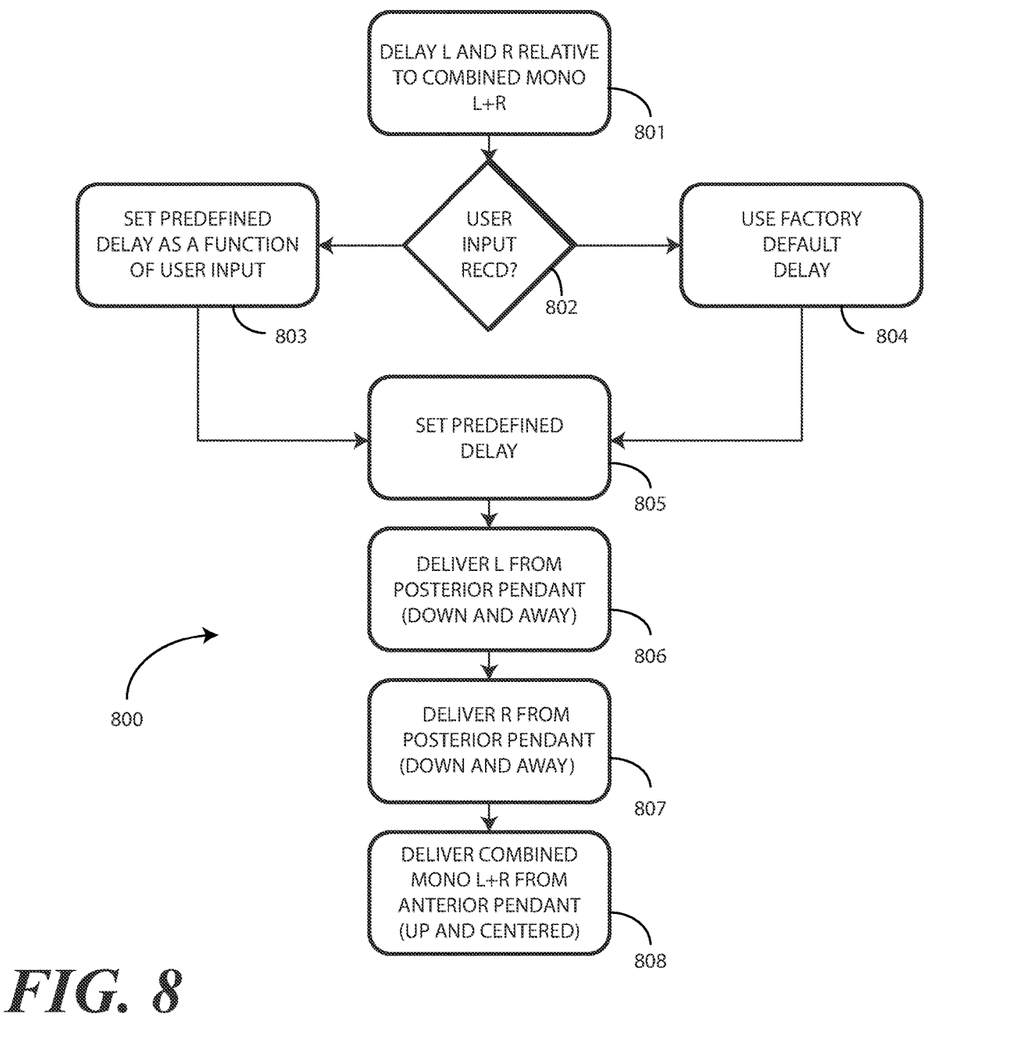
FIG. 8 illustrates one explanatory method in accordance with one or more embodiments of the disclosure.

Turning now to FIG. 8, illustrated therein is one explanatory method 800 for delivering acoustic signals from a wearable electronic device to a user in accordance with one or more embodiments of the disclosure. Beginning at step 801, a predefined delay is introduced between a monaural audio signal combining a left channel audio signal and a right channel audio signal and the left channel audio signal and right channel audio signal. When the acoustic signals are delivered at steps 806-808, the insertion of this predefined delay results in the method 800 delaying delivery of both the left channel audio signal output and the right channel audio signal output relative to the monaural audio signal output.

In one or more embodiments, the delay inserted at step 801 is user definable so as to allow a user to set the location of a stereo image resulting from the aural summation of the monaural audio signal output, the left channel audio signal output, and the right channel audio signal output by fading the stereo image forward or backward. Decision 802 determines whether such user input is received. Where it is, the user identified predefined delay can be determined at step 803 and applied at step 805 to fade the stereo image in accordance with the predefined delay. By contrast, where the user has not provided user input, a default predefined delay can be identified at step 804 and applied at step 805. In one or more embodiments, the default predefined delay is a function of the physical form factor of the wearable electronic device as well as the distances from the loudspeakers delivering the monaural audio signal output, the left channel audio signal output, and the right channel audio signal output from the user's ears. In one or more embodiments, this predefined delay is about one millisecond, although others will be obvious to those of ordinary skill in the art having the benefit of this disclosure.

At step 806, the method 800 delivers a left channel audio signal output from a first side of a posterior pendant of the wearable electronic device. At step 807, the method 800 delivers a right channel audio signal output from a second side of the posterior pendant. In one or more embodiments, steps 806 and 807 comprise delivering the left channel audio signal output and right channel audio signal output toward a caudal side of the wearable electronic device. In one or more embodiments, steps 806-807 comprise delivering the left channel audio signal output and the right channel audio signal output away from each other, and away from the posterior pendant. Thus, in one or more embodiments step 806 comprises delivering the left channel audio signal output by directing the same toward a caudal side of the wearable electronic device and away from the right channel audio signal output. Similarly, step 807 can comprise delivering the right channel audio signal output by directing the same toward the caudal side of the wearable electronic device and away from the left channel audio signal output to maximize channel separation of the acoustic signals.

At step 808, the method 800 delivers a monaural audio signal output combining, using a summation or additive function, the left channel audio signal output with the right channel audio signal output from an anterior pendant of the wearable electronic device to pull a stereo image defined by a combination of the left channel audio signal output, the right channel audio signal output, and the monaural audio signal output toward the anterior pendant. In one or more embodiments, step 808 directs the monaural audio signal output toward a cranial side of the wearable electronic device as previously described.

Figure 9:
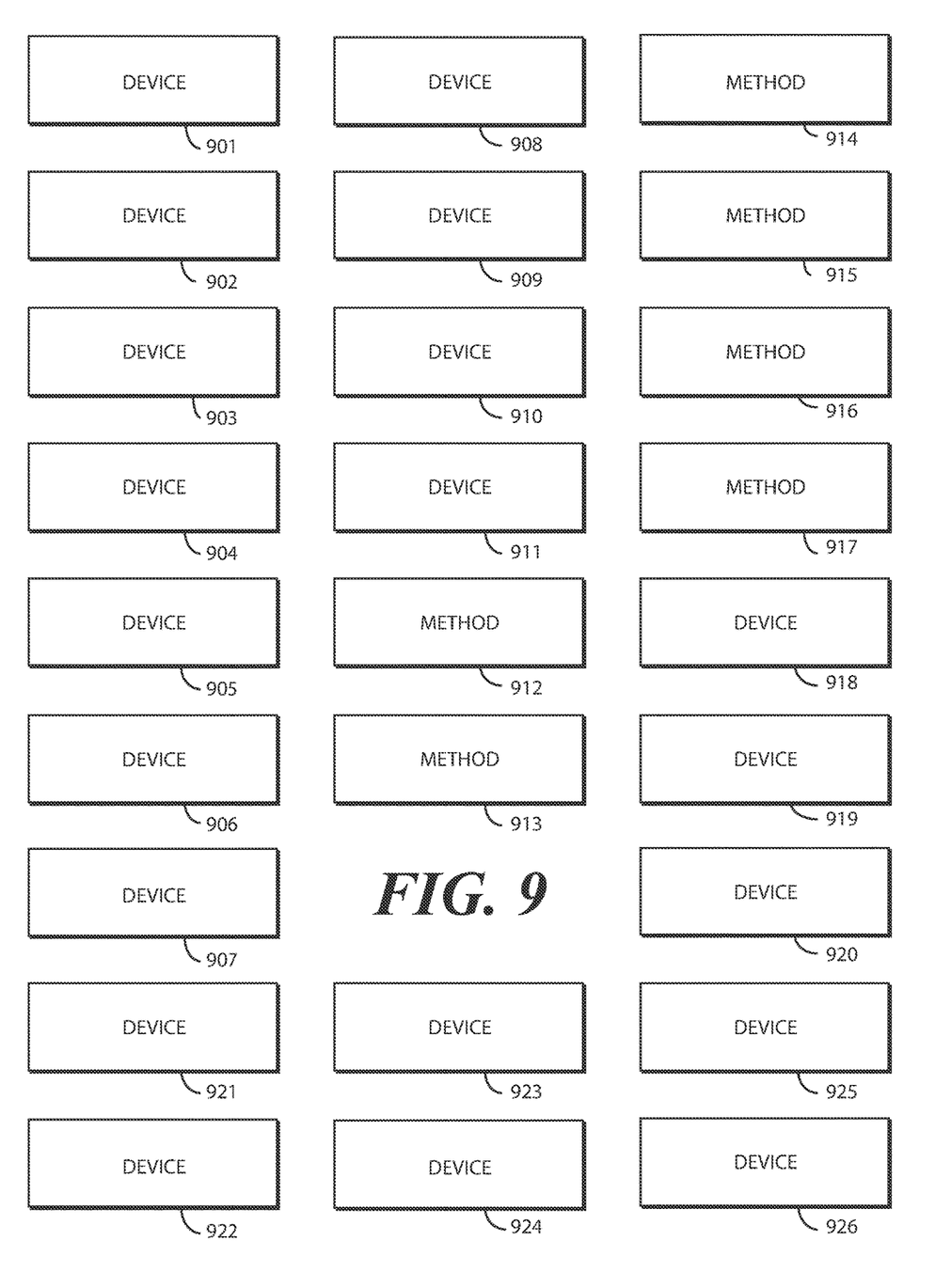
FIG. 9 illustrates various embodiments of the disclosure.

Turning now to FIG. 9, illustrated therein are various embodiments of the disclosure. The embodiments of FIG. 9 are shown as labeled boxes in FIG. 9 due to the fact that the individual components of these embodiments have been illustrated in detail in FIGS. 1-8, which precede FIG. 9. Accordingly, since these items have previously been illustrated and described, their repeated illustration is no longer essential for a proper understanding of these embodiments. Thus, the embodiments are shown as labeled boxes.

Beginning at 901, a wearable electronic device comprises an anterior pendant comprising a single channel anterior audio output delivering a combined left channel audio signal and right channel audio signal through a port of the anterior pendant. At 901, the wearable electronic device comprises a posterior pendant comprising a first single channel posterior audio output delivering the left channel audio signal through a first port of the posterior pendant and a second single channel posterior audio output delivering the right channel audio signal through a second port of the posterior pendant.

At 902, the wearable electronic device of 901 further comprises a first neck strap coupling a first side of the anterior pendant to a first side of the posterior pendant. At 902, the wearable electronic device comprises a second neck strap coupling a second side of the anterior pendant to a second side of the posterior pendant. At 903, the port of the anterior pendant of 901 is situated along an upper surface of the anterior pendant.

At 904, the posterior pendant of 901 Comprises an upper edge, a lower edge, and a first side edge and a second side edge. At 904, the first side edge and the second side edge taper inward as they extend from the upper edge to the lower edge. At 904, the first port of the posterior pendant is situated on the first side edge and the second port of the posterior pendant is situated on the second side edge.

At 905, central axes of the first port and the second port of 904 pass from an interior of the posterior pendant to an exterior of the posterior pendant extend downward from the upper edge and away from each other.

At 906, the wearable electronic device of 901 further comprises one or more processors inserting a predefined delay between the combined left channel audio signal and right channel audio signal emanating from the single channel anterior audio output and each of the left channel audio signal emanating from the first single channel posterior audio output and the right channel audio signal emanating from the second single channel posterior audio output. At 907, the predefined delay of 906 is less than three milliseconds. At 908, the predefined delay of 906 is user definable.

At 909, the wearable electronic device of 903 further comprises one or more processors altering a volume differential between the combined left channel audio signal and right channel audio signal emanating from the single channel anterior audio output and each of the left channel audio signal emanating from the first single channel posterior audio output and the right channel audio signal emanating from the second single channel posterior audio output.

At 910, the posterior pendant of 905 defines a major surface extending between the upper edge, the lower edge, the first side edge, and the second side edge. At 910, each of the first single channel posterior audio output and the second single channel posterior audio output have a central axis passing through the major surface at a non-orthogonal angle.

At 911, each the single channel anterior audio output, the first single channel posterior audio output, and the second single channel posterior audio output of 909 comprise a single loudspeaker. In other embodiments, multiple loudspeakers can be used as the single channel anterior audio output, the first single channel posterior audio output, and the second single channel posterior audio output of 909.

At 912, a method in a wearable electronic device comprises delivering a left channel audio signal output from a first side of a posterior pendant and a right channel audio signal output from a second side of the posterior pendant. At 912, the method comprises delivering a monaural audio signal output combining the left channel audio signal output with the right channel audio signal output from an anterior pendant to pull a stereo image defined by a combination of the left channel audio signal output, the right channel audio signal output, and the monaural audio signal output toward the anterior pendant.

At 913, the delivery of the left channel audio signal output of 912 directs the left channel audio signal output toward a caudal side of the wearable electronic device and away from the right channel audio signal output. At 914, the delivering the right channel audio signal of 913 directs the right channel audio signal output toward the caudal side of the wearable electronic device and away from the left channel audio signal output. At 915, the delivery the monaural audio signal output of 914 directs the monaural audio signal output toward a cranial side of the wearable electronic device.

At 916, the method of 915 further comprises delaying delivery of both the left channel audio signal output and the right channel audio signal output relative to the monaural audio signal output by a predefined delay. At 917, the method of 916 further comprises receiving a user input from a user interface of the wearable electronic device, wherein the user input defines the predefined delay.

At 918, a wearable electronic device comprises an anterior pendant and a posterior pendant. At 918, the wearable electronic device comprises a left shoulder strap coupling left sides of the anterior pendant and the posterior pendant together and a right shoulder strap coupling right sides of the anterior pendant and the posterior pendant together.

At 918, the wearable electronic device comprises a plurality of audio outputs. At 918, the plurality of audio outputs consists of a left channel audio signal output situated at a first end of the posterior pendant, a right channel audio signal output situated at a second end of the posterior pendant separated from the first end of the posterior pendant by a posterior pendant body, and a single combined left channel and right channel audio signal output situated at a cranial edge of the anterior pendant.

At 919, the end of the posterior pendant of 918, the base of the posterior pendant, and the second end of the posterior pendant define a caudally facing frustoconical posterior pendant major surface. At 920, central axes of the left channel audio signal output and the right channel audio signal output of 919 are skew relative to another axis oriented normal with the caudally facing frustoconical posterior pendant major surface.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims.

For example, optimal performance is achieved when the anterior pendant delivers a mac combining a left channel audio signal output and a right channel audio signal output, while the posterior pendant delivers a separated left channel audio signal output and right channel audio signal output. However, it is contemplated that one could separate the monaural audio signal output into a separated left channel audio signal output and a right channel audio signal output using two separated loudspeakers. Illustrating by example, turning back to FIG. 2, a left loudspeaker 221 could deliver a left channel audio signal output 223 that is separated from a right channel audio signal output 222 delivered by a right loudspeaker 220. While insufficiently separated to provide a stereo image by themselves, and while not as optimally performing as the monaural audio signal output that combines these outputs, this minor separation would still pull the stereo image toward the anterior pendant 101.

Accordingly, turning now back to FIG. 9, at 921 a wearable electronic device comprises an anterior pendant comprising an anterior audio output delivering a left channel audio signal and a right channel audio signal user through one or more ports of the anterior pendant. At 921, the wearable electronic device comprises a posterior pendant comprising a first single channel posterior audio output delivering the left channel audio signal through a first port of the posterior pendant and a second single channel posterior audio output delivering the right channel audio signal through a second port of the posterior pendant.

At 922, the wearable electronic device of 921 further comprises a first neck strap coupling a first side of the anterior pendant to a first side of the posterior pendant and a second neck strap coupling a second side of the anterior pendant to a second side of the posterior pendant.

At 923, the one or more ports of the anterior pendant of 921 comprise a single port and anterior audio output comprises a single channel anterior audio output delivers a combined left channel audio signal and right channel audio signal through the single port of the anterior pendant, with the single port of the anterior pendant being situated along an upper surface of the anterior pendant.

At 924, the posterior pendant of 903 comprises an upper edge, a lower edge, and a first side edge and a second side edge that taper inward as they extend from the upper edge to the lower edge. At 924, the first port of the posterior pendant is situated on the first side edge and the second port of the posterior pendant is situated on the second side edge.

At 925, central axes of the first port and second port of 924 pass from an interior of the posterior pendant to an exterior of the posterior pendant extend downward from the upper edge and away from each other. At 926, the wearable electronic device of 923 further comprises one or more processors inserting a predefined delay between the combined left channel audio signal and right channel audio signal emanating from the single channel anterior audio output and each of the left channel audio signal emanating from the first single channel posterior audio output and the right channel audio signal emanating from the second single channel posterior audio output.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

What is claimed is:

1. A wearable electronic device, comprising:
an anterior pendant comprising an anterior audio output delivering a left channel audio signal and a right channel audio signal through one or more ports of the anterior pendant; and
a posterior pendant comprising a first single channel posterior audio output delivering the left channel audio signal through a first port of the posterior pendant and a second single channel posterior audio output delivering the right channel audio signal through a second port of the posterior pendant;
wherein:
the one or more ports comprise a single port and anterior audio output comprises a single channel anterior audio output delivers a combined left channel audio signal and right channel audio signal through the single port of the anterior pendant, with the single port of the anterior pendant being situated along an upper surface of the anterior pendant; and
the posterior pendant comprises an upper edge, a lower edge, and a first side edge and a second side edge that taper inward as they extend from the upper edge to the lower edge, wherein the first port of the posterior pendant is situated on the first side edge and the second port of the posterior pendant is situated on the second side edge.

2. The wearable electronic device of claim 1, further comprising:
a first neck strap coupling a first side of the anterior pendant to a first side of the posterior pendant; and
a second neck strap coupling a second side of the anterior pendant to a second side of the posterior pendant.

3. The wearable electronic device of claim 2, further comprising a decoupling clasp placed along one of the first neck strap or the second neck strap.

4. The wearable electronic device of claim 1, further comprising a user actuation device situated on the anterior pendant.

5. The wearable electronic device of claim 1, wherein central axes of the first port and the second port passing from an interior of the posterior pendant to an exterior of the posterior pendant extend downward from the upper edge and away from each other.

6. The wearable electronic device of claim 1, further comprising one or more processors inserting a predefined delay between the combined left channel audio signal and right channel audio signal emanating from the single channel anterior audio output and each of the left channel audio signal emanating from the first single channel posterior audio output and the right channel audio signal emanating from the second single channel posterior audio output.

7. The wearable electronic device of claim 6, wherein the predefined delay is less than three milliseconds.

8. The wearable electronic device of claim 6, wherein the predefined delay is user definable.

9. The wearable electronic device of claim 1, further comprising one or more processors altering a volume differential between the combined left channel audio signal and right channel audio signal emanating from the single channel anterior audio output and each of the left channel audio signal emanating from the first single channel posterior audio output and the right channel audio signal emanating from the second single channel posterior audio output.

10. The wearable electronic device of claim 5, wherein the posterior pendant defines a major surface extending between the upper edge, the lower edge, the first side edge, and the second side edge, wherein each of the first single channel posterior audio output and the second single channel posterior audio output have a central axis passing through the major surface at a non-orthogonal angle.

11. The wearable electronic device of claim 9, wherein each of the single channel anterior audio output, the first single channel posterior audio output, and the second single channel posterior audio output comprise a single loudspeaker.

12. A wearable electronic device, comprising:
an anterior pendant;
a posterior pendant;
a left shoulder strap coupling left sides of the anterior pendant and the posterior pendant together;
a right shoulder strap coupling right sides of the anterior pendant and the posterior pendant together; and
a plurality of audio outputs, the plurality of audio outputs consisting of:
a left channel audio signal output situated at a first end of the posterior pendant;
a right channel audio signal output situated at a second end of the posterior pendant separated from the first end of the posterior pendant by a posterior pendant body; and
a single combined left channel and right channel audio signal output situated at a cranial edge of the anterior pendant;

wherein the first end of the posterior pendant, a base of the posterior pendant, and the second end of the posterior pendant define a caudally facing frustoconical posterior pendant major surface.

13. The wearable electronic device of claim 12, further comprising one or more processors inserting a predefined delay between sounds delivered by the single combined left channel and right channel audio signal output and other sounds delivered by either the right channel audio signal output or the left channel audio signal output.

14. The wearable electronic device of claim 12, wherein central axes of the left channel audio signal output and the right channel audio signal output are skew relative to another axis oriented normal with the caudally facing frustoconical posterior pendant major surface.

15. A wearable electronic device, comprising:
an anterior pendant comprising an anterior audio output delivering a left channel audio signal and a right channel audio signal through one or more ports of the anterior pendant; and
a posterior pendant comprising a first single channel posterior audio output delivering the left channel audio signal through a first port of the posterior pendant and a second single channel posterior audio output delivering the right channel audio signal through a second port of the posterior pendant;
wherein:
the one or more ports comprise a single port and anterior audio output comprises a single channel anterior audio output delivers a combined left channel audio signal and right channel audio signal through the single port of the anterior pendant, with the single port of the anterior pendant being situated along an upper surface of the anterior pendant;
the posterior pendant comprises an upper edge, a lower edge, and a first side edge and a second side edge that taper inward as they extend from the upper edge to the lower edge, wherein the first port of the posterior pendant is situated on the first side edge and the second port of the posterior pendant is situated on the second side edge; and
wherein central axes of the first port and the second port passing from an interior of the posterior pendant to an exterior of the posterior pendant extend away from each other.

16. The wearable electronic device of claim 15, further comprising one or more processors inserting a predefined delay between the combined left channel audio signal and right channel audio signal emanating from the single channel anterior audio output and each of the left channel audio signal emanating from the first single channel posterior audio output and the right channel audio signal emanating from the second single channel posterior audio output.

17. The wearable electronic device of claim 15, wherein the posterior pendant has a frustoconical major surface.

18. The wearable electronic device of claim 15, further comprising a first neck strap and a second neck strap coupling the anterior pendant to the posterior pendant.

19. The wearable electronic device of claim 18, wherein the anterior audio output, the first single channel posterior audio output, and the second single channel posterior audio output cause the left channel audio signal and the right channel audio signal to create a stereo image situated vertically within a columnar boundary defined by the anterior pendant, the posterior pendant, the first neck strap, and the second neck strap.

20. The wearable electronic device of claim 15, wherein the wearable electronic device is configured to be worn around a neck.

\* \* \* \* \*